United States Patent
Aragon et al.

(10) Patent No.: US 8,072,952 B2
(45) Date of Patent: Dec. 6, 2011

(54) LOAD BALANCING

(75) Inventors: David Bradburn Aragon, Berkeley, CA (US); Liang-Jong Huang, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1085 days.

(21) Appl. No.: 11/975,134

(22) Filed: Oct. 16, 2007

(65) Prior Publication Data

US 2008/0096575 A1    Apr. 24, 2008

Related U.S. Application Data

(60) Provisional application No. 60/852,179, filed on Oct. 16, 2006.

(51) Int. Cl.
  *H04W 4/00* (2009.01)
(52) U.S. Cl. ........................................ 370/338
(58) Field of Classification Search .................. None
  See application file for complete search history.

(56) References Cited

U.S. PATENT DOCUMENTS

| | | |
|---|---|---|
| 3,641,433 A | 2/1972 | Mifflin et al. |
| 4,168,400 A | 9/1979 | De Couasnon et al. |
| 4,176,316 A | 11/1979 | DeRosa et al. |
| 4,247,908 A | 1/1981 | Lockart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |

(Continued)

FOREIGN PATENT DOCUMENTS

WO    WO94/03986    2/1994

(Continued)

OTHER PUBLICATIONS

U.S. Appl. No. 11/326,966, filed Jan. 2006, Taylor.

(Continued)

*Primary Examiner* — Anh-Vu Ly
(74) *Attorney, Agent, or Firm* — Harrity & Harrity, LLP

(57) ABSTRACT

A technique for associating clients with APs in an advantageous manner may involve local balancing of clients across APs. This may involve providing instructions to APs to disable client association. Alternatively, this technique may involve load balancing across controllers.

13 Claims, 10 Drawing Sheets

U.S. PATENT DOCUMENTS

| | | |
|---|---|---|
| 4,850,009 A | 7/1989 | Zook et al. |
| 4,872,182 A | 10/1989 | Mcrae et al. |
| 4,894,842 A | 1/1990 | Brockhoven et al. |
| 4,901,307 A | 2/1990 | Gilhousen et al. |
| 4,933,952 A | 6/1990 | Albrieux et al. |
| 4,933,953 A | 6/1990 | Yagi |
| 4,995,053 A | 2/1991 | Simpson et al. |
| 5,008,899 A | 4/1991 | Yamamoto |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,142,550 A | 8/1992 | Tymes |
| 5,151,919 A | 9/1992 | Dent |
| 5,157,687 A | 10/1992 | Tymes |
| 5,187,675 A | 2/1993 | Dent et al. |
| 5,231,633 A | 7/1993 | Hluchyj et al. |
| 5,280,498 A | 1/1994 | Tymes et al. |
| 5,285,494 A | 2/1994 | Sprecher et al. |
| 5,329,531 A | 7/1994 | Diepstraten |
| 5,339,316 A | 8/1994 | Diepstraten |
| 5,371,783 A | 12/1994 | Rose et al. |
| 5,418,812 A | 5/1995 | Reyes et al. |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,561,841 A | 10/1996 | Markus |
| 5,568,513 A | 10/1996 | Croft et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,774,460 A | 6/1998 | Schiffel et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,828,960 A | 10/1998 | Tang et al. |
| 5,838,907 A | 11/1998 | Hansen |
| 5,844,900 A | 12/1998 | Hong et al. |
| 5,872,968 A | 2/1999 | Knox et al. |
| 5,875,179 A | 2/1999 | Tikalsky |
| 5,887,259 A | 3/1999 | Zicker et al. |
| 5,896,561 A | 4/1999 | Schrader et al. |
| 5,915,214 A | 6/1999 | Reece et al. |
| 5,920,821 A | 7/1999 | Seazholtz et al. |
| 5,933,607 A | 8/1999 | Tate et al. |
| 5,949,988 A | 9/1999 | Feisullin et al. |
| 5,953,669 A | 9/1999 | Stratis et al. |
| 5,960,335 A | 9/1999 | Umemoto et al. |
| 5,982,779 A | 11/1999 | Krishnakumar et al. |
| 5,987,062 A | 11/1999 | Engwer et al. |
| 5,987,328 A | 11/1999 | Ephremides et al. |
| 6,005,853 A | 12/1999 | Wang et al. |
| 6,011,784 A | 1/2000 | Brown |
| 6,041,240 A | 3/2000 | McCarthy et al. |
| 6,078,568 A | 6/2000 | Wright |
| 6,088,591 A | 7/2000 | Trompower |
| 6,101,539 A | 8/2000 | Kennelly et al. |
| 6,118,771 A | 9/2000 | Tajika et al. |
| 6,119,009 A | 9/2000 | Baranger et al. |
| 6,160,804 A | 12/2000 | Ahmed et al. |
| 6,188,694 B1 | 2/2001 | Fine et al. |
| 6,199,032 B1 | 3/2001 | Anderson |
| 6,208,629 B1 | 3/2001 | Jaszewki et al. |
| 6,208,841 B1 | 3/2001 | Wallace et al. |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,256,300 B1 | 7/2001 | Ahmed et al. |
| 6,256,334 B1 | 7/2001 | Adachi |
| 6,262,988 B1 | 7/2001 | Vig |
| 6,285,662 B1 | 9/2001 | Watannabe |
| 6,304,596 B1 | 10/2001 | Yamano et al. |
| 6,317,599 B1 | 11/2001 | Rappaport et al. |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ulfongene |
| 6,404,772 B1 | 6/2002 | Beach et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,580,700 B1 | 6/2003 | Pinard et al. |
| 6,587,680 B1 | 7/2003 | Ata-Laurila et al. |
| 6,614,787 B1 | 9/2003 | Jain et al. |
| 6,624,762 B1 | 9/2003 | End, III |
| 6,625,454 B1 | 9/2003 | Rappaport et al. |
| 6,631,267 B1 | 10/2003 | Clarkson et al. |
| 6,659,947 B1 | 12/2003 | Carter et al. |
| 6,661,787 B1 | 12/2003 | O'Connell et al. |
| 6,687,498 B2 | 2/2004 | McKenna et al. |
| 6,697,415 B1 | 2/2004 | Mahany |
| 6,725,260 B1 | 4/2004 | Philyaw |
| 6,747,961 B1 | 6/2004 | Ahmed et al. |
| 6,760,324 B1 | 7/2004 | Scott et al. |
| 6,839,338 B1 | 1/2005 | Amara et al. |
| 6,839,348 B2 | 1/2005 | Tang et al. |
| 6,879,812 B2 | 4/2005 | Agrawal et al. |
| 6,957,067 B1 | 10/2005 | Iyer et al. |
| 6,973,622 B1 | 12/2005 | Rappaport et al. |
| 6,978,301 B2 | 12/2005 | Tindal |
| 7,020,438 B2 | 3/2006 | Sinivaara et al. |
| 7,020,773 B1 | 3/2006 | Otway et al. |
| 7,024,394 B1 | 4/2006 | Ashour et al. |
| 7,062,566 B2 | 6/2006 | Amara et al. |
| 7,068,999 B2 | 6/2006 | Ballai |
| 7,110,756 B2 | 9/2006 | Diener |
| 7,116,979 B2 | 10/2006 | Backes et al. |
| 7,146,166 B2 | 12/2006 | Backes et al. |
| 7,155,518 B2 | 12/2006 | Forslow |
| 7,221,927 B2 | 5/2007 | Kolar et al. |
| 7,224,970 B2 | 5/2007 | Smith et al. |
| 7,263,366 B2 | 8/2007 | Miyashita |
| 7,280,495 B1 | 10/2007 | Zweig et al. |
| 7,317,914 B2 | 1/2008 | Adya et al. |
| 7,324,468 B2 | 1/2008 | Fischer |
| 7,324,487 B2 | 1/2008 | Saito |
| 7,359,676 B2 | 4/2008 | Hrastar |
| 7,370,362 B2 | 5/2008 | Olson et al. |
| 7,376,080 B1 | 5/2008 | Riddle et al. |
| 7,421,248 B1 | 9/2008 | Laux et al. |
| 7,430,189 B2 * | 9/2008 | Bejerano et al. ............. 370/332 |
| 7,466,678 B2 | 12/2008 | Cromer et al. |
| 7,480,264 B1 * | 1/2009 | Duo et al. .................. 370/310.2 |
| 7,489,648 B2 | 2/2009 | Griswold |
| 7,509,096 B2 | 3/2009 | Palm et al. |
| 7,529,925 B2 | 5/2009 | Harkins |
| 7,551,619 B2 | 6/2009 | Tiwari |
| 7,573,857 B1 * | 8/2009 | Radhakrishnan et al. .... 370/338 |
| 7,573,859 B2 | 8/2009 | Taylor |
| 7,577,453 B2 | 8/2009 | Matta |
| 7,840,695 B2 * | 11/2010 | Sethi et al. .................... 709/235 |
| 7,969,937 B2 * | 6/2011 | Iyer et al. ..................... 370/329 |
| 2001/0024953 A1 | 9/2001 | Balogh |
| 2002/0052205 A1 | 5/2002 | Belostofsky et al. |
| 2002/0060995 A1 | 5/2002 | Cervello et al. |
| 2002/0069278 A1 | 6/2002 | Forslow |
| 2002/0095486 A1 | 7/2002 | Bahl |
| 2002/0101868 A1 | 8/2002 | Clear et al. |
| 2002/0176437 A1 | 11/2002 | Busch et al. |
| 2002/0191572 A1 | 12/2002 | Weinstein et al. |
| 2003/0014646 A1 | 1/2003 | Buddhikot et al. |
| 2003/0018889 A1 | 1/2003 | Burnett et al. |
| 2003/0055959 A1 | 3/2003 | Sato |
| 2003/0107590 A1 | 6/2003 | Levillain et al. |
| 2003/0134642 A1 | 7/2003 | Kostic et al. |

| | | |
|---|---|---|
| 2003/0135762 A1 | 7/2003 | Macaulay |
| 2003/0174706 A1 | 9/2003 | Shankar et al. |
| 2003/0227934 A1 | 12/2003 | White et al. |
| 2004/0001467 A1* | 1/2004 | Cromer et al. ............ 370/338 |
| 2004/0003285 A1 | 1/2004 | Whelan et al. |
| 2004/0019857 A1 | 1/2004 | Teig et al. |
| 2004/0025044 A1 | 2/2004 | Day |
| 2004/0047320 A1 | 3/2004 | Eglin |
| 2004/0053632 A1 | 3/2004 | Nikkelen et al. |
| 2004/0062267 A1 | 4/2004 | Minami et al. |
| 2004/0064560 A1 | 4/2004 | Zhang et al. |
| 2004/0068668 A1 | 4/2004 | Lor et al. |
| 2004/0095914 A1 | 5/2004 | Katsube et al. |
| 2004/0095932 A1 | 5/2004 | Astarabadi et al. |
| 2004/0120370 A1 | 6/2004 | Lupo |
| 2004/0143428 A1 | 7/2004 | Rappaport et al. |
| 2004/0165545 A1 | 8/2004 | Cook |
| 2004/0208570 A1 | 10/2004 | Reader |
| 2004/0221042 A1 | 11/2004 | Meier |
| 2004/0230370 A1 | 11/2004 | Tzamaloukas |
| 2004/0236702 A1 | 11/2004 | Fink et al. |
| 2004/0255167 A1 | 12/2004 | Knight |
| 2004/0259555 A1 | 12/2004 | Rappaport et al. |
| 2005/0030929 A1 | 2/2005 | Swier et al. |
| 2005/0037818 A1 | 2/2005 | Seshadri et al. |
| 2005/0053046 A1* | 3/2005 | Wang ............ 370/338 |
| 2005/0054326 A1 | 3/2005 | Rogers |
| 2005/0058132 A1 | 3/2005 | Okano et al. |
| 2005/0059405 A1 | 3/2005 | Thomson et al. |
| 2005/0059406 A1 | 3/2005 | Thomson et al. |
| 2005/0064873 A1 | 3/2005 | Karaoguz et al. |
| 2005/0068925 A1 | 3/2005 | Palm et al. |
| 2005/0073980 A1 | 4/2005 | Thomson et al. |
| 2005/0097618 A1 | 5/2005 | Arling et al. |
| 2005/0122977 A1 | 6/2005 | Lieberman |
| 2005/0128989 A1 | 6/2005 | Bhagwat et al. |
| 2005/0135316 A1* | 6/2005 | Cromer et al. ............ 370/338 |
| 2005/0157730 A1 | 7/2005 | Grant et al. |
| 2005/0180358 A1 | 8/2005 | Kolar et al. |
| 2005/0181805 A1 | 8/2005 | Gallagher |
| 2005/0193103 A1 | 9/2005 | Drabik |
| 2005/0223111 A1 | 10/2005 | Bhandaru et al. |
| 2005/0239461 A1 | 10/2005 | Verma et al. |
| 2005/0240665 A1 | 10/2005 | Gu et al. |
| 2005/0245269 A1 | 11/2005 | Demirhan et al. |
| 2005/0259597 A1 | 11/2005 | Benedetotto et al. |
| 2005/0265321 A1 | 12/2005 | Rappaport et al. |
| 2005/0273442 A1 | 12/2005 | Bennett |
| 2005/0276218 A1 | 12/2005 | Ooghe et al. |
| 2006/0045050 A1 | 3/2006 | Floros et al. |
| 2006/0064497 A1* | 3/2006 | Bejerano et al. ............ 709/228 |
| 2006/0104224 A1 | 5/2006 | Singh et al. |
| 2006/0128415 A1 | 6/2006 | Horikoshi et al. |
| 2006/0161983 A1 | 7/2006 | Cothrell et al. |
| 2006/0174336 A1 | 8/2006 | Chen |
| 2006/0182074 A1* | 8/2006 | Kubler et al. ............ 370/338 |
| 2006/0189311 A1 | 8/2006 | Cromer et al. |
| 2006/0200862 A1 | 9/2006 | Olson et al. |
| 2006/0203743 A1* | 9/2006 | Quinn et al. ............ 370/254 |
| 2006/0227726 A1* | 10/2006 | Zuniga et al. ............ 370/254 |
| 2006/0245393 A1 | 11/2006 | Bajic |
| 2006/0248331 A1 | 11/2006 | Harkins |
| 2007/0025265 A1 | 2/2007 | Porras et al. |
| 2007/0064718 A1 | 3/2007 | Ekl et al. |
| 2007/0070937 A1 | 3/2007 | Demirhan et al. |
| 2007/0083924 A1 | 4/2007 | Lu |
| 2007/0086378 A1 | 4/2007 | Matta et al. |
| 2007/0091889 A1 | 4/2007 | Xiao et al. |
| 2007/0189222 A1 | 8/2007 | Kolar et al. |
| 2007/0206552 A1* | 9/2007 | Yaqub et al. ............ 370/338 |
| 2007/0260720 A1 | 11/2007 | Morain |
| 2008/0008117 A1 | 1/2008 | Alizadeh-Shabdiz |
| 2008/0013481 A1 | 1/2008 | Simons et al. |
| 2008/0056200 A1 | 3/2008 | Johnson |
| 2008/0056211 A1 | 3/2008 | Kim et al. |
| 2008/0096575 A1 | 4/2008 | Aragon et al. |
| 2008/0107077 A1 | 5/2008 | Murphy |
| 2008/0114784 A1 | 5/2008 | Murphy |
| 2008/0117822 A1 | 5/2008 | Murphy et al. |
| 2008/0151807 A1* | 6/2008 | Meier et al. ............ 370/312 |
| 2008/0151844 A1 | 6/2008 | Tiwari |
| 2008/0162921 A1 | 7/2008 | Chesnutt et al. |
| 2009/0031044 A1 | 1/2009 | Barrack et al. |
| 2009/0198999 A1 | 8/2009 | Harkins |
| 2010/0322198 A1* | 12/2010 | Friday et al. ............ 370/332 |

FOREIGN PATENT DOCUMENTS

| | | |
|---|---|---|
| WO | WO-9403986 | 2/1994 |
| WO | WO99/11003 | 3/1999 |
| WO | WO-9911003 | 3/1999 |
| WO | WO03/085544 A1 | 10/2003 |
| WO | WO-03085544 | 10/2003 |
| WO | WO 2004/095192 A2 | 11/2004 |
| WO | WO 2004/095800 A1 | 11/2004 |
| WO | WO-2004095192 | 11/2004 |
| WO | WO-2004095800 | 11/2004 |

OTHER PUBLICATIONS

U.S. Appl. No. 11/330,877, filed Jan. 2006, Matta.
U.S. Appl. No. 11/331,789, filed Jan. 2006, Matta et al.
U.S. Appl. No. 11/351,104, filed Feb. 2006, Tiwari.
U.S. Appl. No. 11/377,859, filed Mar. 2006, Harkins.
U.S. Appl. No. 11/400,165, filed Apr. 2006, Tiwari.
U.S. Appl. No. 11/445,750, filed May 2006, Matta.
U.S. Appl. No. 11/417,830, filed May 2006, Morain.
U.S. Appl. No. 11/417,993, filed May 2006, Jar. et al.
U.S. Appl. No. 11/437,537, filed May 2006, Freund et al.
U.S. Appl. No. 11/437,538, filed May 2006, Zeldin.
U.S. Appl. No. 11/437,387, filed May 2006, Zeldin et al.
U.S. Appl. No. 11/437,582, filed May 2006, Bugwadia et al.
U.S. Appl. No. 11/451,704, filed Jun. 2006, Riley.
Acampora and Winters, IEEE Communications Magazine, 25(8):11-20 (1987).
Acampora and Winters, IEEE Journal on selected Areas in Communications. SAC-5:796-804 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30-Dec. 4, 1980.
Fortune et al., IEEE Computational Science and Engineering, "Wise Design of Indoor Wireless Systems: Practical Computation and Optimization", p. 58-68 (1995).
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).
LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the 13th Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.

Perram and Martinez, "Technology Developments for Low-Cost Residential Alarm Systems", Proceedings 1977 Carnahan Conference on Crime Countermeasures, Apr. 6-8, pp. 45-50 (1977).

Piazzi et al., "Achievable Accuracy of Site-Specific Path-Loss Predictions in Residential Environments", IEEE Transactions on Vehicular Technology, vol. 48, No. 3, May 1999.

Seidel et al., "Site-Specific Propagation Prediction for Wireless In-Building Personal Communications System Design", IEEE Transactions on Vehicular Technology, vol. 43, No. 4, Nov. 1994.

Skidmore et al., "Interactive Coverage Region and System Design Simulation for Wireless Communication Systems in Multi-floored Indoor Environments, SMT Plus" IEEE ICUPC '96 Proceedings (1996).

Ullmo et al., "Wireless Propagation in Buildings: A Statistic Scattering Approach", IEEE Transactions on Vehicular Technology, vol. 48, No. 3, May 1999.

U.S. Appl. No. 11/487,722, filed Jul. 2006, Simons et al.
U.S. Appl. No. 11/592,891, filed Nov. 2006, Murphy, James.
U.S. Appl. No. 11/595,119, filed Nov. 2006, Murphy, James.
U.S. Appl. No. 11/604,075, filed Nov. 2006, Murphy et al.
U.S. Appl. No. 11/643,329, filed Dec. 2006, Towari, Manish.
U.S. Appl. No. 11/648,359, filed Dec. 2006, Gast et al.
U.S. Appl. No. 11/690,654, filed Mar. 2007, Keenly et al.
U.S. Appl. No. 11/801,964, filed May 2007, Simone et al.
U.S. Appl. No. 11/845,029, filed Aug. 2007, Gast, Mathew S.
U.S. Appl. No. 11/852,234, filed Sep. 2007, Gast et al.
U.S. Appl. No. 11/944,346, filed Nov. 2007, Gast, Mathew S.
U.S. Appl. No. 11/966,912, filed Dec. 2007, Chesnutt et al.
U.S. Appl. No. 11/970,484, filed Jan. 2008, Gast, Mathew S.
U.S. Appl. No. 12/077,051, filed Mar. 2008, Gast, Mathew S.

Puttini, R., Percher, J., Me, L., and de Sousa, R. 2004. A fully distributed IDS for MANET. In *Proceedings of the Ninth international Symposium on Computers and Communications 2004* vol. 2 (*Iscc"04*)—vol. 2 (Jun. 28-Jul. 1, 2004). ISCC. IEEE Computer Society, Washington, DC, 331-338.

Acampa and Winters, IEEE Journal on selected Areas in Communications. SAC-5:796-804 (1987).

Acampora and Winters, IEEE Communications Magazine, 25(8):11-20 (1987).

Bing and Subramanian, IEEE, 1318-1322 (1997).

Durgin, et al., "Measurements and Models for Radio Path Loss and Penetration Loss in and Around Homes and Trees at 5.85 GHz", IEEE Transactions on Communications, vol. 46, No. 11, Nov. 1998.

Fortune et al., IEEE Computational Science and Engineering, "Wise Design of Indoor Wireless Systems: Practical Computation and Optimization", p. 58-68 (1995).

Freret et al., Applications of Spread-Spectrum Radio to Wireless Terminal Communications, Conf. Record. Nat'l Telecom. Conf., Nov. 30-Dec. 4, 1980.

Geier, Jim. Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.

Ho et al., "Antenna Effects on Indoor Obstructed Wireless Channels and a Deterministic Image-Based Wide-Based Propogation Model for In-Building Personal Communications Systems", International Journal of Wireless Information Networks, vol. 1, No. 1, 1994.

Kim et al., "Radio Propogation Measurements and Prediction Using Three-Dimensional Ray Tracing in Urban Environments at 908 MHz and 1.9 GHz", IEEE Transactions on Vehicular Technology, vol. 48, No. 3, May 1999.

Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Users", (1977).

LAN/MAN Standards Committee of the IEEE Computer Society, Part 11: Wireless LAN Medium Access Control (MAC) and Physical Layer (PHY) Specifications :Higher Speed Physical Layer Extension in the 2.4 GHz Band, IEEE Std. 801.11b (1999).

Okamoto and Xu, IEEE, Proceedings of the 13th Annual Hawaii International Conference on System Sciences, pp. 54-63 (1997).

Panjawani et al., "Interactive Computation of Coverage Regions for Wireless Communication in Multifloored Indoor Environments", IEEE Journal on Selected Areas in Communications, vol. 14, No. 3, Apr. 1996.

Perram and Martinez, "Technology Developments for Low-Cost Residential Alarm Systems", Proceedings 1977 Carnahan Conference on Crime Countermeasures, Apr. 6-8, pp. 45-50 (1977).

Piazzi et al., "Achievable Accuracy of Site-Specific Path-Loss Predictions in Residential Environments", IEEE Transactions on Vehicular Technology, vol. 48, No. 3, May 1999.

Puttini, R., Percher, J., Me, L., and De Sousa, R. 2004. A fully distributed IDS for MANET. In *Proceedings of the Ninth international Symposium on Computers and Communications 2004* vol. 2 (*Iscc"04*)—vol. 2 (Jun. 28-Jul. 1, 2004). ISCC. IEEE Computer Society. Washington. DC. 331-338.

Seidel et al, "Site-Specific Propagation Prediction for Wireless In-Building Personal Communications System Design", IEEE Transactions on Vehicular Technology, vol. 43, No. 4, Nov. 1994.

Skidmore et al., "Interactive Coverage Region and System Design Simulation for Wireless Communication Systems in Multi-floored Indoor Environments, SMT Plus", IEEE ICUPC '96 Proceedings (1996).

Ullmo et al., "Wireless Propogation in Buildings: A Statistic Scattering Approach", IEEE Transactions on Vehicular Technology, vol. 48, No. 3, May 1999.

Co-pending U.S. Appl. No. 10/778,901, filed Feb. 13, 2004.
Co-pending U.S. Appl. No. 11/784,307, filed Apr. 5, 2007.
Co-pending U.S. Appl. No. 11/377,859, filed Mar. 15, 2006.
Co-pending U.S. Appl. No. 12/401,073, filed Mar. 10, 2009.
Co-pending U.S. Appl. No. 11/326,966, filed Jan. 5, 2006.
Co-pending U.S. Appl. No. 12/500,392, filed Jul. 9, 2009.
Co-pending U.S. Appl. No. 11/330,877, filed Jan. 11, 2006.
Co-pending U.S. Appl. No. 11/351,104, filed Feb. 8, 2006.
Co-pending U.S. Appl. No. 11/331,789, filed Jan. 14, 2006.
Co-pending U.S. Appl. No. 11/445,750, filed Jun. 1, 2006.
Co-pending U.S. Appl. No. 12/491,201, filed Jun. 24, 2009.
Co-pending U.S. Appl. No. 11/417,830, filed May 3, 2006.
Co-pending U.S. Appl. No. 11/400,165, filed Apr. 5, 2006.
Co-pending U.S. Appl. No. 11/592,891, filed Nov. 3, 2006.
Co-pending U.S. Appl. No. 12/603,391, filed Oct. 21, 2009.
Co-pending U.S. Appl. No. 11/595,119, filed Nov. 10, 2006.
Co-pending U.S. Appl. No. 11/604,075, filed Nov. 22, 2006.
Co-pending U.S. Appl. No. 11/487,722, filed Jul. 17, 2006.
Co-pending U.S. Appl. No. 11/643,329, filed Dec. 20, 2006.
Co-pending U.S. Appl. No. 12/489,295, filed Jun. 22, 2009.
Co-pending U.S. Appl. No. 11/966,912, filed Dec. 28, 2007.
Co-pending U.S. Appl. No. 12/131,028, filed May 3, 2008.
Co-pending U.S. Appl. No. 12/336,492, filed Dec. 16, 2008.

Notice of Allowance Mailed Feb. 26, 2007 in Co-pending U.S. Appl. No. 10/778,901, filed Feb. 13, 2004.

Non-Final Office Action Mailed Sep. 22, 2009 in Co-pending U.S. Appl. No. 11/784,307, filed Apr. 5, 2007.

Notice of Allowance Mailed Feb. 27, 2009 in Co-pending U.S. Appl. No. 11/377,859, filed Mar. 15, 2006.

Final Office Action Mailed Aug. 27, 2008 in Co-pending U.S. Appl. No. 11/377,859, filed Mar. 15, 2006.

Non-Final Office Action Mailed Jan. 8, 2008 in Co-pending U.S. Appl. No. 11/377,859, filed Mar. 15, 2006.

Notice of Allowance Mailed Jun. 11, 2009 in Co-pending U.S. Appl. No. 11/326,966, filed Jan. 5, 2006.

Non-Final Office Action Mailed Nov. 10, 2008 in Co-pending U.S. Appl. No. 11/326,966, filed Jan. 5, 2006.

Non-Final Office Action Mailed Aug. 6, 2009 in Co-pending U.S. Appl. No. 11/330,877, filed Jan. 11, 2006.

Final Office Action Mailed Mar. 13, 2009 in Co-pending U.S. Appl. No. 11/330,877, filed Jan. 11, 2006.

Non-Final Office Action Mailed Sep. 11, 2008 in Co-pending U.S. Appl. No. 11/330,877, filed Jan. 11, 2006.

Non-Final Office Action Mailed Dec. 2, 2009 in Co-pending U.S. Appl. No. 11/351,104, filed Feb. 8, 2006.

Final Office Action Mailed Jun. 10, 2009 in Co-pending U.S. Appl. No. 11/351,104, filed Feb. 8, 2006.

Non-Final Office Action Mailed Oct. 28, 2008 in Co-pending U.S. Appl. No. 11/351,104, filed Feb. 8, 2006.
Notice of Allowance Mailed Feb. 23, 2010 in Co-pending U.S. Appl. No. 11/331,789, filed Jan. 14, 2006.
Non-Final Office Action Mailed Aug. 5, 2009 in Co-pending U.S. Appl. No. 11/331,789, filed Jan. 14, 2006.
Final Office Action Mailed Oct. 23, 2008 in Co-pending U.S. Appl. No. 11/331,789, filed Jan. 14, 2006.
Non-Final Office Action Mailed Jun. 13, 2008 in Co-pending U.S. Appl. No. 11/331,789, filed Jan. 14, 2006.
Notice of Allowance Mailed Jun. 16, 2009 in Co-pending U.S. Appl. No. 11/445,750, filed Jun. 1, 2006.
Non-Final Office Action Mailed Feb. 17, 2009 in Co-pending U.S. Appl. No. 11/445,750, filed Jun. 1, 2006.
Final Office Action Mailed May 28, 2009 in Co-pending U.S. Appl. No. 11/417,830, filed May 3, 2006.
Non-Final Office Action Mailed Nov. 14, 2008 in Co-pending U.S. Appl. No. 11/417,830, filed May 3, 2006.
Notice of Allowance Mailed Apr. 23, 2009 in Co-pending U.S. Appl. No. 11/400,165, filed Apr. 5, 2006.
Non-Final Mailed Aug. 19, 2008 in Co-pending U.S. Appl. No. 11/400,165, filed Apr. 5, 2006.
Final Office Action Mailed Jul. 20, 2009 in Co-pending U.S. Appl. No. 11/592,891, filed Nov. 3, 2006.
Non-Final Office Action Mailed Jan. 14, 2009 in Co-pending U.S. Appl. No. 11/592,891, filed Nov. 3, 2006.
Final Office Action Mailed Jan. 5, 2010 in Co-pending U.S. Appl. No. 11/595,119, filed Nov. 10, 2006.
Non-Final Office Action Mailed Jul. 21, 2009 in Co-pending U.S. Appl. No. 11/595,119, filed Nov. 10, 2006.
Non-Final Office Action Mailed Aug. 7, 2009 in Co-pending U.S. Appl. No. 11/487,722, filed Jul. 17, 2006.
Notice of Allowance Mailed Mar. 19, 2010, in Co-pending U.S. Appl. No. 11/487,722, filed Jul. 17, 2006.
International Search Report PCT/US05/004702 dated Aug. 10, 2006, pp. 1-3.
Written Opinion PCT/US05/004702 dated Aug. 10, 2006, pp. 1-5.
International Search Report PCT/US06/09525 dated Sep. 13, 2007, pp. 1-2.
Written Opinion PCT/US06/09525 dated Sep. 13, 2007, pp. 1-7.
International Search Report PCT/US06/40498 dated Dec. 28, 2007, pp. 1-2.
Written Opinion PCT/US06/40498 dated Dec. 28, 2007, pp. 1-5.
International Search Report PCT/US07/14847 dated Apr. 1, 2008, pp. 1-4.
Written Opinion PCT/US07/14847 dated Apr. 1, 2008, pp. 1-4.
International Search Report PCT/US07/089134 dated Apr. 10, 2008, pp. 1-3.
Written Opinion PCT/US07/089134 dated Apr. 10, 2008, pp. 1-4.

* cited by examiner

LOAD BALANCING

CROSS-REFERENCE TO RELATED APPLICATIONS

The present application claims priority to U.S. Provisional Patent App. No. 60/852,179, by Liang-Jong Huang and David Bradburn Aragon entitled "Wireless Load Balancing System and Method" filed on Oct. 16, 2006, which is incorporated herein by reference.

BACKGROUND

In 802.11 infrastructure basic service set (BSS) networks, connections are initiated from the client side. Many clients may seek to associate with many APs in a network. In some cases only a few APs receive most of the clients. The few APs may be come heavily loaded while many other APs remain under utilized. The underutilization may be spread over multiple APs associated with a single access area, or may be distributed over many access areas. Clients may experience poor service from an overloaded AP while some APs remain relatively underutilized.

The foregoing examples of the related art and limitations related therewith are intended to be illustrative and not exclusive. Other limitations of the related art will become apparent to those of skill in the art upon a reading of the specification and a study of the drawings.

SUMMARY

The following examples and aspects thereof are described and illustrated in conjunction with systems, tools, and methods that are meant to be exemplary and illustrative, not limiting in scope. In some of the examples one or more of the above-described problems has been reduced or eliminated, while other examples are directed to other improvements.

A technique for associating clients with APs in an advantageous manner may involve local balancing of clients across APs. This may involve providing instructions to APs to disable client association procedures. Alternatively, this technique may involve load balancing across controllers. The technique may calculate overlaps between APs and may determine target loads for the APs. Using target loads, APs may be instructed to steer clients to other APs when target loads are met or exceeded. Communication between multiple controllers may facilitate balanced loads across a network.

A system based on the technique may include a target load calculator. Target loads may be adjusted dynamically. The system may dynamically rebalance client loads on APs, thereby improving overall performance of the system.

A method based on the technique may disable association capabilities of an AP to allow clients to associate with other APs thereby distributing the load of clients. The method may be used in collaboration with various algorithms and create useful applications. A load balancing algorithm may balance wireless traffic based on certain criteria among a group of APs. In a non-limiting example, clients may be steered in multiple bands to a preferred band in a multi-band wireless network.

Consider, for the purposes of example only, a network having two APs, each under the control of separate controllers. There are two clients seeking to associate with one AP. The two APs overlap sufficiently for either one of the APs to handle both clients. A target load of one client per AP is established for each AP. A first client associates with a first AP. The first AP is instructed to stop associating new clients. The remaining one client then associates with the second AP. Advantageously, the client load of each AP is balanced, and each AP has an approximately evenly distributed client load.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

In 802.11 infrastructure BSS networks, connections are initiated from the client side. If there are multiple access points (APs) within range of a client, the client selects one for association. Although the criteria for selecting an AP are embedded in the client and are implementation-specific, nevertheless clients frequently apply similar strategies, such as strongest signal strength, and consequently make similar selections. There is therefore a tendency for some APs to attract more (or even all) clients than the others in a service area, thwarting an administrator's attempts to improve service by providing multiple APs to offer more bandwidth.

Load balancing and client steering may be implemented to redistribute clients to multiple APs. Load balancing suggests a method to balance the wireless traffic among APs to meet certain criteria. Client steering suggests an approach to induce the client to connect with another AP. Herein, both methods are referred to as "load balancing" and client steering is referred to explicitly when a distinction is considered helpful for improved understanding of the techniques described.

A technique for client steering involves overseeing a network to determine which AP allows admittance and which AP disallows admittance based on certain criteria. A system according to this technique may include multiple controllers and APs in an Electronic Switching System (ESS) network. The controllers oversee the ESS network and determine which AP allows admittance and which AP disallows admittance based on certain criteria. In a non-limiting embodiment, for APs disallowing admittance, a controller may activate an AP's steering function and adjust a safety valve, if needed, by sending message commands through the network. For APs allowing admittance, controllers will deactivate their steering functions in a similar manner.

Figure 1:
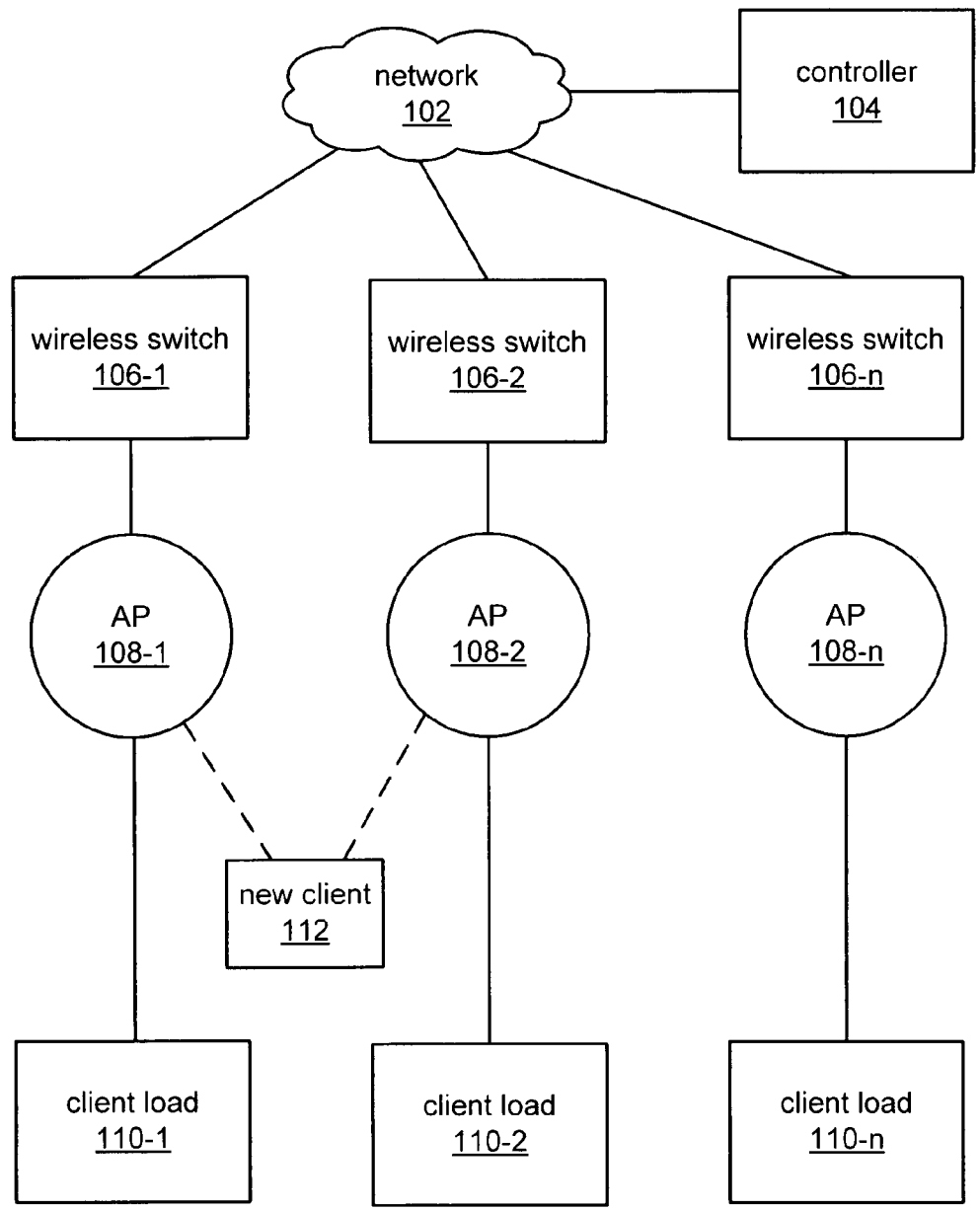
FIG. 1 depicts a diagram of an example of a system for load balancing.

FIG. 1 depicts a diagram 100 of an example of a system for load balancing. FIG. 1 includes network 102, controller 104, wireless switch 106-1 through wireless switch 106-n (collectively wireless switches 106), AP 108-1 through AP 108-n (collectively APs 108s), client load 110-1 through client load 110-n (collectively client loads 110), and new client 112.

In the example of FIG. 1, network 102 couples controller 104 to wireless switches 106. The network 102 may be practically any type of communications network, such as, by way of example but not limitation, the Internet or an infrastructure network. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web).

In the example of FIG. 1, wireless switches 106 swap topology data and client information with each other, or other wireless switches in the network. One or more of the wireless switches 106 and the controller 104 may be the same unit. Alternatively, the wireless switches 106 may be separate units from the controller 104, and may receive instructions from the controller 104 via network 102.

In the example of FIG. 1, the APs 108 are hardware units that act as a communication node by linking wireless mobile stations such as PCs to a wired backbone network. The APs 108 may generally broadcast a service set identifier (SSID). In an example, the APs 108 connect users to other users within the network, and may serve as a point of connection between WLAN and a wired network. The APs may have one or more radios. In a non-limiting embodiment, the radios are configured for 802.11 standard transmissions.

In the example of FIG. 1, the client loads 110 may be any previously associated computing devices capable of WLAN communication. APs may be part of the client load. In a non-limiting example, an un-tethered AP is coupled to AP 108-1, and is part of the client load 110-1. Client load may simply be the number of client sessions on a radio. However, other measures of load may be used. In a non-limiting example, a system may include a bandwidth reservation scheme e.g. for IP telephone clients. There, client load can be a weighted sum where the weights depend on the bandwidth reserved by each client. In another non-limiting example, load can be measured reciprocally by measuring the available bandwidth, transmit queue availability, or some other suitable measure of AP capacity remaining, and the sense of the target thresholds adjusted appropriately.

In the example of FIG. 1, the new client 112 may be any computing device capable of wireless local area network (WLAN) communication. The client 112 is depicted as ready to associate with either AP 108-1 or AP 108-2. Given client loads 110 it may be advantageous to cause either AP 108-1 or AP 108-2 to refrain from associating with new client 112 so as to balance the client loads 110.

Figure 2:
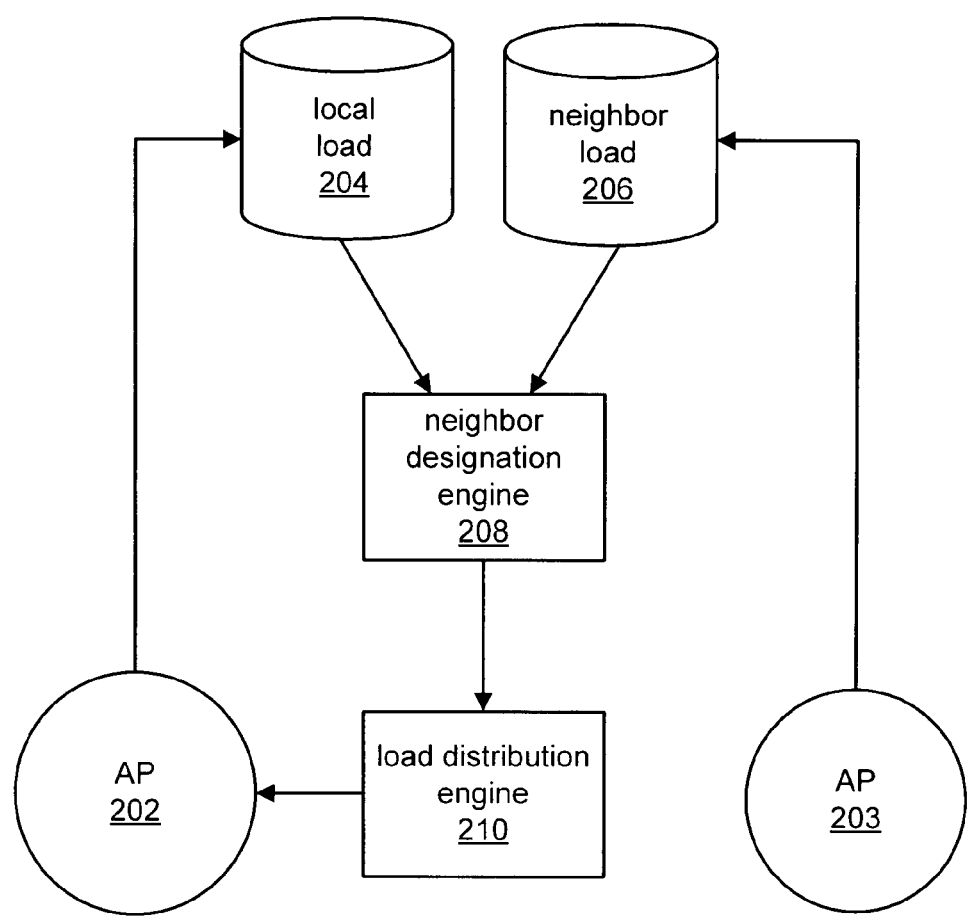
FIG. 2 depicts a diagram of an example of a system balancing loads for two APs.

FIG. 2 depicts a diagram 200 of an example of a system balancing loads for two APs. FIG. 2 includes AP 202, AP 203, local load 204, neighbor load 206, neighbor designation engine 208, and load distribution engine 208.

In the example of FIG. 2, the AP 202 may be one of two or more APs with which a client may associate. AP 202 may have a current load of zero or more clients. An overloaded AP may have more clients than a specified threshold.

In the example of FIG. 2, the AP 203 is an AP near the AP 202. AP 203 may be close enough to AP 202 and the client that the AP 203 may associate the client as an alternative AP to the AP 202.

In the example of FIG. 2, the local load 204 may be a database, data store, file, table, or any known or convenient manner of storing a client load. The local load may be updated dynamically in association with the AP 202 to include recently added clients at AP 202.

In the example of FIG. 2, the neighbor load 206 may also be a database, data store, file, table, or any known or convenient manner of storing data. The neighbor load may be updated dynamically in association with the AP 203 to include clients recently added to the AP 203.

In the example of FIG. 2, the neighbor designation engine 208 may identify neighbors to an AP that may be suitable for associating with the client. A client may be steered to neighbor APs if desirable.

In the example of FIG. 2, the load distribution engine 210 may have steering functionality. For example, the load distribution engine 210 may instruct the AP 202 to refrain from associating with a client for a duration of time, or until the AP 202 is instructed to resume associating with new clients. Alternatively, the load distribution engine 210 may actively balance loads across adjacent APs by disassociating clients from currently relatively heavily loaded APs and re-associating the clients with a relatively lightly loaded adjacent AP.

In the example of FIG. 2, in operation, the load of the AP 202 is recorded in the local load database 204. The load of the AP 203 is recorded in the neighbor load database 206. The neighbor designation engine 208 identifies the AP 203 as a neighbor of the AP 202 that may be able to associate a new client. More specifically, the neighbor designation engine identifies a client as being within range of both the AP 202 and the AP 203. The neighbor designation engine 208 knows which of the APs 202, 203 have a heavier load and provides sufficient data to the load distribution engine 210 to balance the load. For illustrative purposes only, it is assumed that the AP 202 receives the load balancing instructions, rather than the AP 203. The load distribution engine 210 instructs the AP 202 to be non-responsive to association requests and other communications from the new client. In this way, the AP 202 ceases associating with clients, and the new clients are forced to associate at the AP 203.

Figure 3:
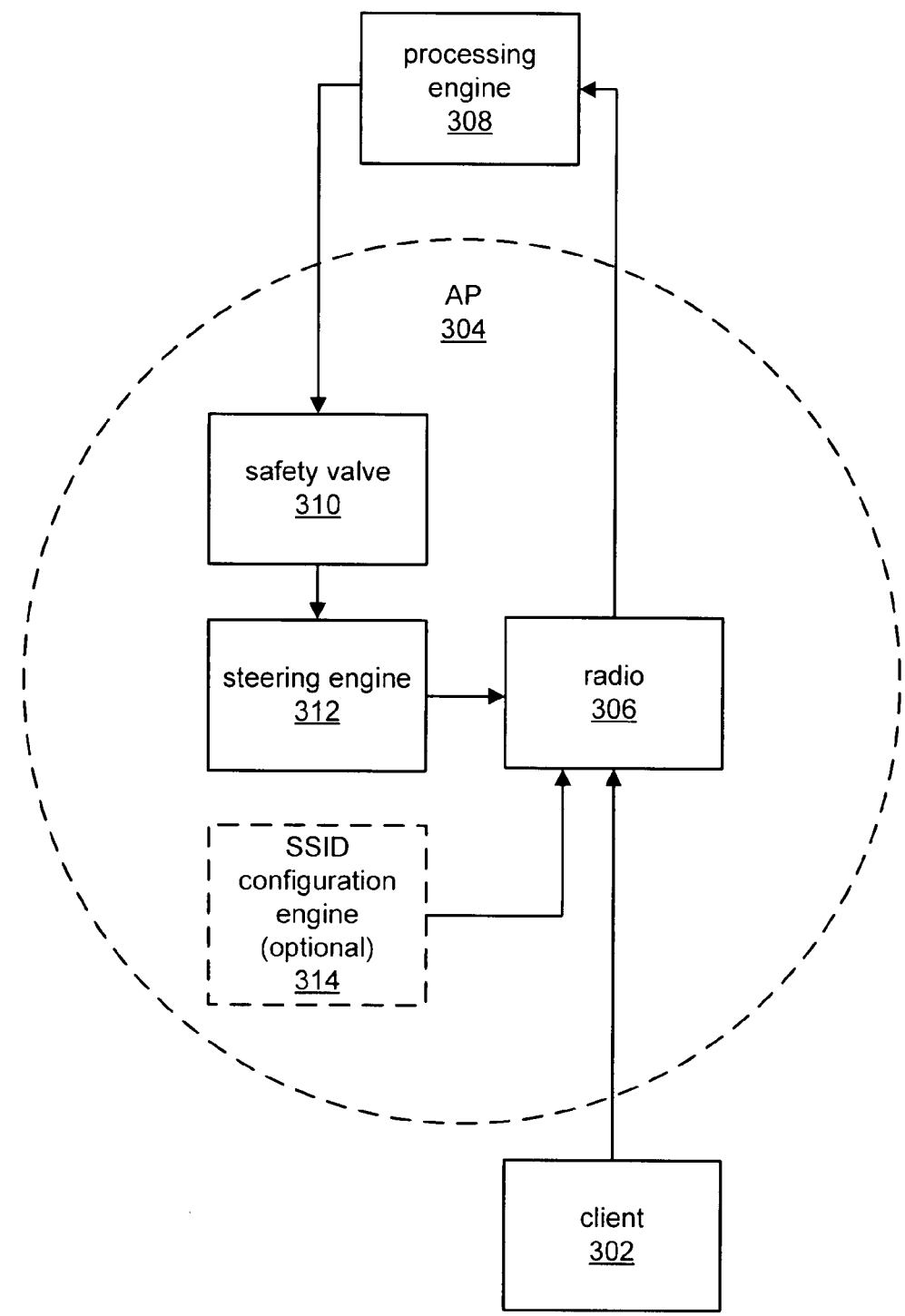
FIG. 3 depicts a diagram of an example of an AP in communication with a client.

FIG. 3 depicts a diagram 300 of an example of an AP in communication with a client. The diagram 300 includes client 302, AP 304, and processing engine 308.

In the example of FIG. 3, the client 302 may be any client computing device capable of WLAN communication. It is possible that APs allowing admittance receive a burst of requests for probe, authentication and association from clients, and responses to clients have been already sent before a controller commands a change of admittance state. Either the associated clients can be later steered by the method mentioned above, or the admittance policy can be evaluated before granting the association request. If the policy shows that the AP has reached the watermark to shut down the admittance, the AP should decline association requests from clients and the controller should activate the AP's steering function.

In the example of FIG. 3, the AP 304 includes radio 306, safety valve 310, steering engine 312, and optional SSID configuration engine 314. In the example of FIG. 3, the radio 306 may be any radio device capable of WLAN communication. By way of example but not limitation, the radio 306 may be capable of 802.11 communication.

In the example of FIG. 3, the safety valve 310 may prevent an AP from steering clients for more than a maximum amount of time. The safety valve may use a timer or counter to limit the duration of the steering function. Various clients manufactured by different vendors may have their own probing, authentication and association patterns. Advantageously, timers may be dynamically adjusted either by the controllers or by the AP itself based on certain criteria to meet application requirements.

In the example of FIG. 3, the steering engine 312 may cause the AP to refrain from responding to probe requests or authentication requests until the safety valve is open. The AP may also take out the SSID information in beacons. When steering associated clients is desired, a de-authentication with a reason code may first be sent to a client. The steering engine 312 may be activated afterwards. Depending on the requirements and the certainty of available APs to steer clients to, the safety valve may be set to a large value to make the previously associated AP as well as APs disallowing admittance almost invisible to the client so that the client will associate with another AP, allowing de-authentication. Alternatively, the timer may be set to a low value so that a client may re-associate with the previously associated AP in the case there are no suitable APs to associate with other than the first AP.

In the example of FIG. 3, the optional SSID configuration engine 314 may be used to create useful applications. The optional SSID configuration engine may work with a load balancing algorithm to balance wireless traffic based on certain criteria among a group of APs. The optional SSID configuration engine may be used to steer clients capable of multiple bands to a preferred band in a multi-band wireless network. Alternatively, the SSID configuration engine 314 may be used to selectively provide wireless service to a certain group of clients.

In the example of FIG. 3, in operation, the client transmits probe requests or authentication requests to radio 306, however, processing 308 has instructed safety valve 310 to close, and steering engine 312 to steer all clients to other APs because AP 304 has reached a capacity, and it may be necessary to drive clients to other APs to balance the load on the network. Steering engine 312 causes AP 304 to provide no response to probe requests or authentication requests from client 302. Optional SSID configuration engine 314 may completely remove SSID information from beacons so as to preclude n new clients from requesting association with radio 306.

Figure 4:
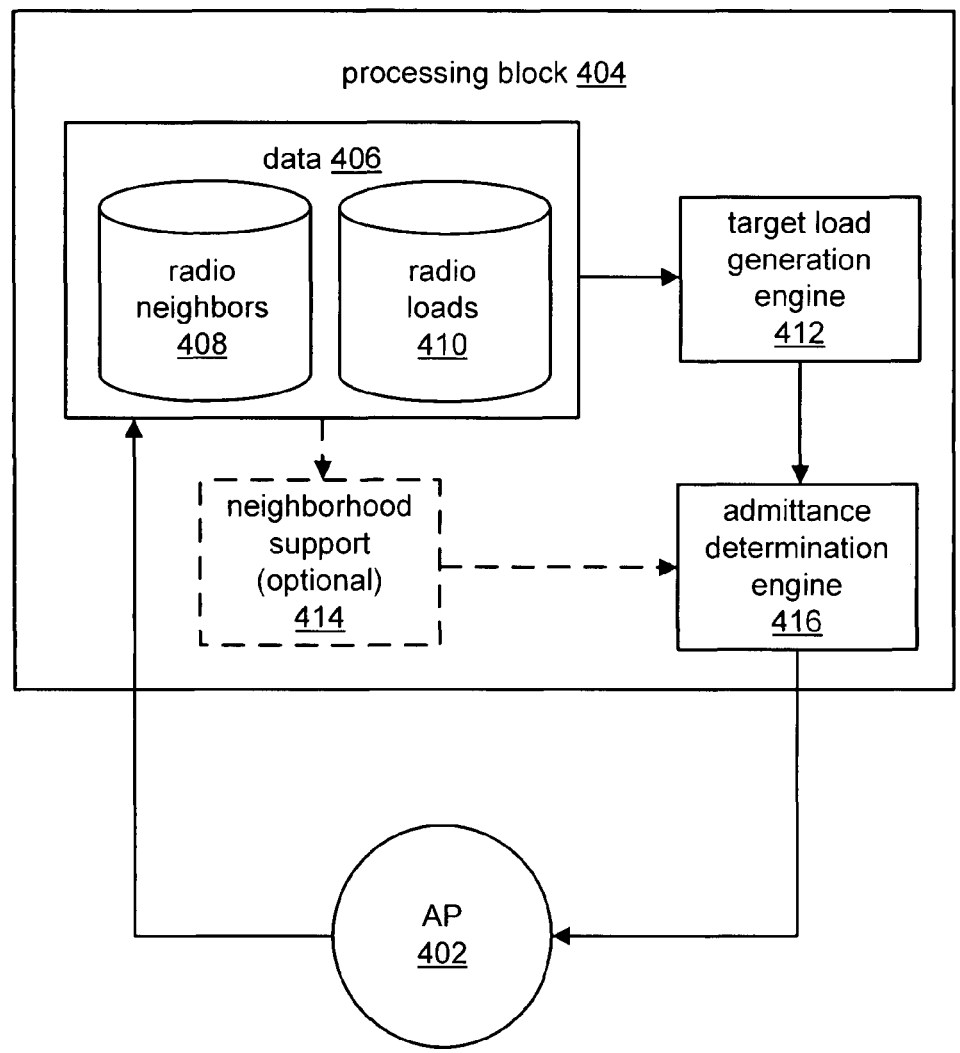
FIG. 4 depicts a diagram of an example of a system in communication with an AP.

FIG. 4 depicts a diagram 400 of an example of a system in communication with an AP. FIG. 4 includes AP 402 and processing block 404. In the example of FIG. 4, the AP 402 may connect users to other users within the network, and may serve as a point of connection between WLAN and a wired network.

In the example of FIG. 4, the processing block 404 includes data 406, target load generation engine 412, optional neighborhood support 414, and admittance determining engine 416.

in the example of FIG. 4 data 406 includes radio neighbors 408 and radio loads 410. Radio neighbors 408 may be may be a database, data store, file, table, or any known or convenient manner of storing information about neighboring radios. The radio neighbors 408 may include entries for the received signal strength of one or more radios as received by the AP 402. Radio loads 410 may be a database, data store, file, table, or any known or convenient manner of storing information. Neighbor load 410 may store a number of clients associated with one or more neighboring radios.

In the example of FIG. 4, target load generation engine 412 may use load and radio overlap information to compute a target load for each radio connected to the processing 404. The target load may take into consideration a proportion of a radio's actual load that could potentially be handled by other (overlapping) radios, and also the proportion of those neighboring radios' loads that could be potentially handled by the radio whose target is being computed.

In the example of FIG. 4, the optional neighborhood support 414 may be a subsystem for recording and reporting transmitters detected by an AP radio. The optional neighborhood support 414 may periodically scan channels other than the channel on which the radio is primarily operating. Upon detecting another access point transmitting on either its own or another channel, the optional neighborhood support 414 may pass a message to a controller showing the transmitter's media access control (MAC) address and received signal strength.

The optional neighborhood support 414 may be a part of a device such as a Trapeze Mobility Point AP which allows one transmitter to exhibit multiple MAC addresses on the air. MAC addresses may assigned within defined ranges so that the (possibly several) MAC addresses belonging to one transmitter may be correctly ascribed to one transmitter by the controller that receives the report.

In the example of FIG. 4, the admittance determination engine 416 may control the AP 402 such as by instructing the AP to cease to admit new clients for a duration of time.

In the example of FIG. 4, in operation, the AP provides received signal strengths of neighboring radios to radio neighbors 408. Client loads on the neighboring APs may be provided to radio loads 410. Target load generation engine 412 produces a target load for the AP 402. Optionally neighborhood support 414 provides information about the loads of neighborhood APs. Using the information provided by the target load generation engine 412, and optionally the neighborhood support 414, the admittance determination engine 416 decides whether to instruct AP 402 to continue admitting new clients or to refrain from admitting new clients.

Figure 5:
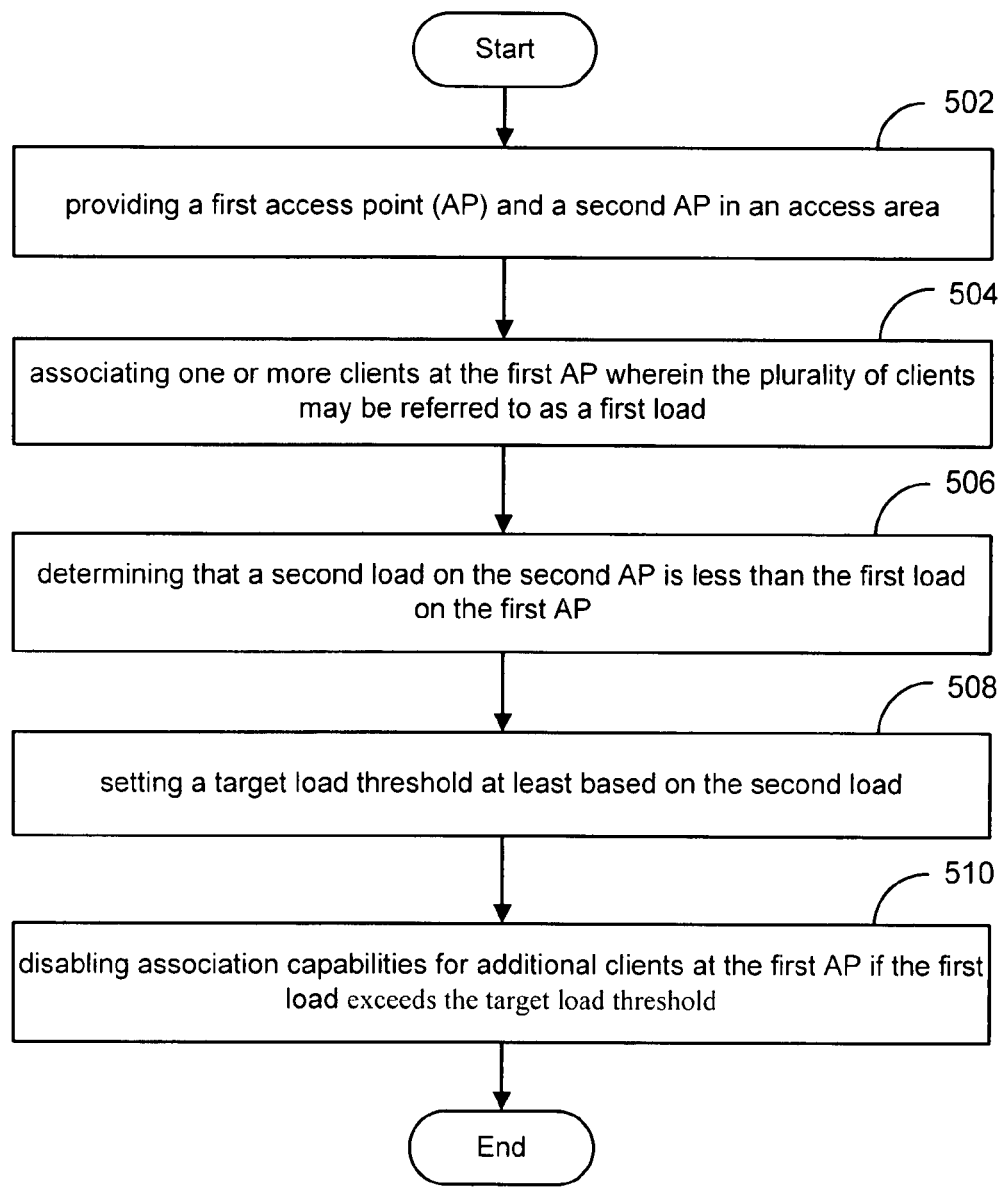
FIG. 5 depicts a flowchart of an example of a method for load balancing.

FIG. 5 depicts a flowchart 500 of an example of a method for load balancing. The method is organized as a sequence of modules in the flowchart 500. However, it should be understood that these and modules associated with other methods described herein may be reordered for parallel execution or into different sequences of modules.

In the example of FIG. 5, the flowchart 500 starts at module 502 with providing a first AP and a second AP in an access area. The first AP and the second AP may be part of a network connected to a controller. The controller may monitor the loads on the first AP and the second AP and provide load balancing and other features for the network.

In the example of FIG. 5, the flowchart continues to module 504 with associating one or more clients at the first AP wherein the plurality of clients may be referred to as a first load. The associations may be recorded and provided to the controller for monitoring of the load on the first AP.

In the example of FIG. 5, the flowchart continues to module 506 with determining that a second load on the second AP is less than the first load on the first AP. As the controller monitors the loads on the APs it is connected to the controller may be aware that one or more APs have a lower load than the first AP. The controller may dynamically update AP loading as the APs associate with additional clients.

In the example of FIG. 5, the flowchart continues to module 508 with setting a target load threshold at least based on the second load. In dynamically rebalancing the load on the network, the controller may set target threshold by considering the second load. In a non-limiting example, the target load may be raised because a number of clients on the network has increased overall with the additional loading of the new client.

In the example of FIG. 5, the flowchart continues to module 510 with disabling association capabilities for additional clients at the first AP if the first load exceeds the target threshold. In balancing the load the controller may prevent the AP from taking on more clients. This will cause the clients to associate with other APs. By causing clients to associate with under loaded APs, the controller may dynamically rebalance the network.

Figure 6:
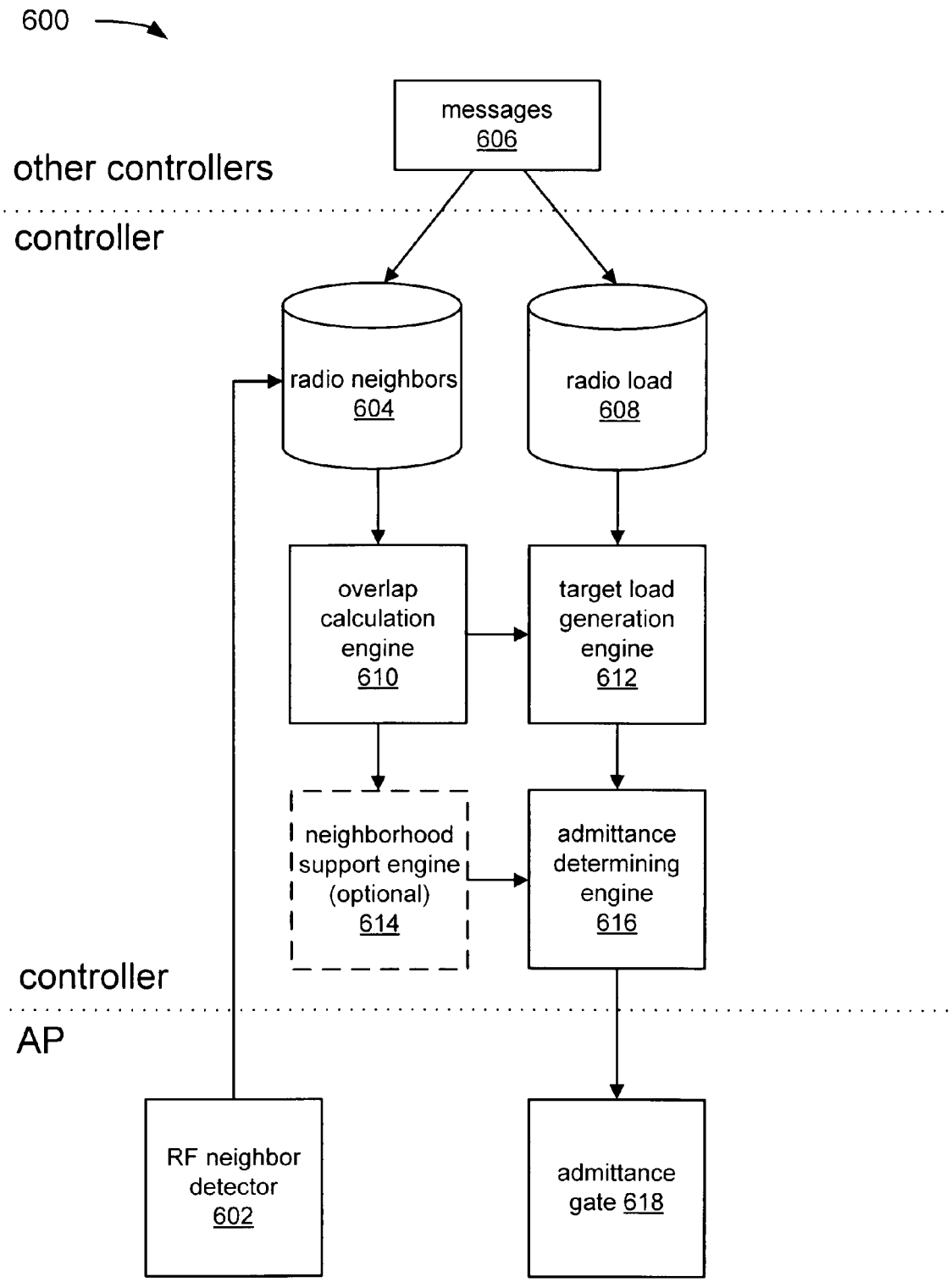
FIG. 6 depicts a diagram of an example of a system for load balancing.

FIG. 6 depicts a diagram 600 of an example of a system for load balancing. FIG. 6 includes RF neighbor detector 602, radio neighbors 604, messages 606, radio load 608, overlap calculation engine 610, target load calculation engine 612, optional neighborhood support 614, admittance determining engine 616, and admittance gate 618.

In the example of FIG. 6, RF neighbor detector 602 may be a subsystem for recording and reporting transmitters detected by an AP radio. RF neighbor detector 602 may periodically scan channels other than the channel on which the radio is primarily operating. Upon detecting another access point transmitting on either its own or another channel, RF neighbor detector 602 may pass a message to a controller showing the transmitter's MAC address and received signal strength.

In the example of FIG. 6, radio neighbors 604 may be may be a database, data store, file, table, or any known or convenient manner of storing information about neighboring radios. The radio neighbors 604 may include entries for the received signal strength of one or more radios as received by the AP using RF neighbor detector 602.

In the example of FIG. 6, the messages 606 may be received into the radio neighbors 604 and the radio load 608 from other controllers. It may be possible for load balancing to occur across multiple controllers. In that case, it may be necessary for the multiple controllers to provide messages regarding the loads on various APs. RF data pertaining to an AP that is associated with another controller may be included in a message that is sent to the controller. Conversely, messages 606 may be received into the radio neighbors 604. Messages pertaining to radio neighbors may be termed part of a radio "neighborhood." The radio neighbors 604 may include messages received from other controllers in the radio neighborhood. In a non-limiting example, a client is steered to a local AP, and a message is transmitted and stored into the local radio load because the client was steered to the local AP.

In the example of FIG. 6, the radio load 608 may include information about clients connected to APs. The controller may maintain this information for making load balancing decisions such as to steer clients to nearby APs or to steer clients to APs associated with other controllers.

In the example of FIG. 6, the overlap calculation engine 610, may estimate the conditional probability that a client can be served by a given radio in a load-balancing scheme, given that it is associated to another such radio. Overlap may be "inward" if the client could be served by the given radio but is presently associated to a neighbor radio, and as "outward" if the client is associated to the given radio but could be served by a neighbor.

A client may be deemed able to be served by a radio if that radio's signal strength at the client's location exceeds a predetermined threshold. In a non-limiting example, the threshold may be set to −65 dB.

For target loads to optimally account for all client load in the system, overlap calculations between any two radios may necessarily be symmetric. The inward overlap of a neighbor's coverage area into the central radio's coverage area may have the same value as the central radio's outward overlap calculated at the neighbor radio.

Two radios may be attached to different network controllers, so an important issue is that inward and outward overlaps be calculated consistently from the two perspectives, with minimal requirement to pass data between the controllers. The overlap calculator accomplishes the calculation using only two measurements, namely, the received signal strength (RSSI) of each radio as received at the other radio.

The following notation may be used to calculate the overlap:

$s_{j@k}$ denotes the signal measurement of radio j as heard at radio k $s_{ref}$ is the reference signal strength defining the outer limit of a radio's coverage area L is the path loss exponent (typically assumed to be about 3 inside an office building)

$r_j$ denotes the radius of radio j's coverage area $d_{jk}$ is the distance between radios j and k The path loss exponent and the reference signal strength may be predetermined and the same for all radios. The overlap calculation for two radios j and k may then require measurement only of the two values $s_{j@k}$ and $s_{k@j}$. First, the overlap calculator forms two intermediate terms representing the estimated radii of each coverage area in units of the inter-radio distance:

$$\frac{r_j}{d_{jk}} = 10^{\frac{s_{j@k}-s_{ref}}{10L}}$$

and $$\frac{r_k}{d_{jk}} = 10^{\frac{s_{k@j}-s_{ref}}{10L}}$$

The overlap calculator then detects the limiting conditions where there is either no overlap, or complete overlap (i.e. one coverage area completely contained within the other):

$$\text{overlap} = \begin{cases} 0, & \frac{r_j}{d_{jk}} + \frac{r_k}{d_{jk}} \leq 1 \\ 1, & \left|\frac{r_j}{d_{jk}} - \frac{r_k}{d_{jk}}\right| > 1 \end{cases}$$

The above equations for overlap define two limits of a range. If we choose k as the index for the lower signal strength value then the absolute value signs can be removed and the above limits re-written as limits on one of the two measured values in terms of the other:

$$\text{overlap} = \begin{cases} 0, & \frac{r_j}{d_{jk}} \leq \left(1 - \frac{r_k}{d_{jk}}\right) \\ 1, & \frac{r_j}{d_{jk}} > \left(1 + \frac{r_k}{d_{jk}}\right) \end{cases}$$

For values of $$\frac{r_j}{d_{jk}}$$

within the range $$\left(1 \pm \frac{r_k}{d_{jk}}\right),$$

the overlap calculation engine 610 interpolates smoothly. The operation of the invention may not be extremely sensitive to the precise interpolation function chosen. A function may be derived by trigonometry assuming that the coverage areas are circular. The interpolation may also be linear.

The overlap value may be interpreted as a fraction or proportion, expressing the area of overlapping coverage in terms of the smaller of the two individual coverage areas. The fraction may provide the outward overlap of the smaller area into the larger or equivalently, the inward overlap of the larger area into the smaller.

The overlap calculator may compute converse overlaps. A converse overlap may be an overlap in terms of a larger coverage area. The converse overlap may be found by multiplying the above-derived overlap value by the ratio of the two coverage areas, which is the square of the ratio of their radii, namely $$\left(\frac{r_k/d_{jk}}{r_j/d_{jk}}\right)^2.$$

In the example of FIG. 6, the target load calculation engine 612, may generate a load level for each radio in terms of the number of clients and the number of other radios available to serve those clients. In a non-limiting example, the target load may be calculated as estimated number of clients that the given radio can serve, divided by the estimated number of radios able to serve those clients.

In generating target loads, radios generally do not cover identical ranges, and thus cannot be assumed able to serve the same clients. Even assuming each radio's coverage area to be approximately circular, in a realistic installation both the center locations and the radii of those areas will differ; therefore, the overlaps between radio coverage areas may generally be partial rather than total.

To provide the ability to balance client load in such an environment, the target load calculation for a given radio weights the factors as follows. The radio is regarded as being in the center of an approximately circular neighborhood, around which are neighboring AP radios each having some degree of overlap with the central radio's coverage area. Inward overlap may designate an estimated fraction of the neighbor's load that can also be covered by the central radio, and outward overlap may designate an estimated fraction of the central radio's client load that is also in the neighbor radio's coverage area. In the numerator of the target load value (of the central radio), each neighbor radio's client load is weighted by its inward overlap. For the denominator of the target load value, each neighbor radio may count as 1 times the outward overlap.

For the central radio, both the inward and outward overlaps may be defined as 1.0. For the central radio, a numerator of the target load accumulates the client load of the radio. The denominator accumulates a count of 1.0, i.e. the central radio counts as one radio. The target loads on the several radios may converge to values that together account for the entire client load in the system.

In the example of FIG. 6, the optional neighborhood support 614 may be a subsystem for recording and reporting transmitters detected by an AP radio. Channels other than a current channel on which the radio is primarily operating may be scanned. Upon detecting another access point transmitting on either its own or another channel, a message may be passed to a controller showing the transmitter's MAC address and received signal strength.

In the example of FIG. 6, the admittance determining engine 616, The admittance determining engine 616 may produce an admittance value that determines the action of the admittance gate 618. The admittance value for a radio may set the radio's propensity to accept an additional client. The admittance value may be calculated by comparing the radio's current load against its target load. In a non-limiting example, admittance may be set to 0 (admit no client) if the radio's load is above its target load, or to 1 (admit any client) otherwise.

The admittance determining engine may also produce values intermediate between 0 and 1, which instruct the admittance gate to admit some (but not all) potential new clients. Admittance may be accomplished by applying multiple thresholds to the difference between current load and target load, and outputting an appropriate value depending on which of the thresholds are exceeded.

In the example of FIG. 6, the admittance gate 618 may control a radio's response to new clients. The admittance gate 618 may be a software component within an AP that influences the AP to associate or not to associate clients. The admittance gate 618 may cause the radio to respond normally to 802.11 probes and 802.11 authentication requests when new clients are to be admitted, or to inhibit or delay responses when new clients are not to be admitted.

The admittance gate 618 may respond to commands from admittance determining engine 616. The commands may include a binary admittance value that instructs the radio whether to admit or inhibit new clients.

The admittance gate 618 may also have a rule table for conditioning a response based on characteristics of the client. The rule table may include a rule for responding to a client that is already associated to the radio. In a non-limiting example, the AP is subject to a rule that requires that the AP always respond to an already-associated client. The rule table may have an associated function that evaluates a hardware address of a client and causes the client to associate with an AP because the function falls within a range of values. Using the function the AP may quickly determine whether a hardware address is within a range to which the AP should respond.

The rule table may also have other rules. In a non-limiting example a signal strength rule instructs the AP to respond to clients whose requests exceed a programmed signal strength value, thereby creating a preference for clients that are physically near the AP.

An exemplary rule computes a hash value from a MAC address and associates a client with a first AP if the hash value is odd or a second AP if the hash value is even. In applying such a rule, consider two APs that have overlapping coverage areas. One can be instructed to respond to clients when the output of a MAC hash function is even, and the other instructed to respond when the output of the same MAC hash function is odd.

Figure 7:
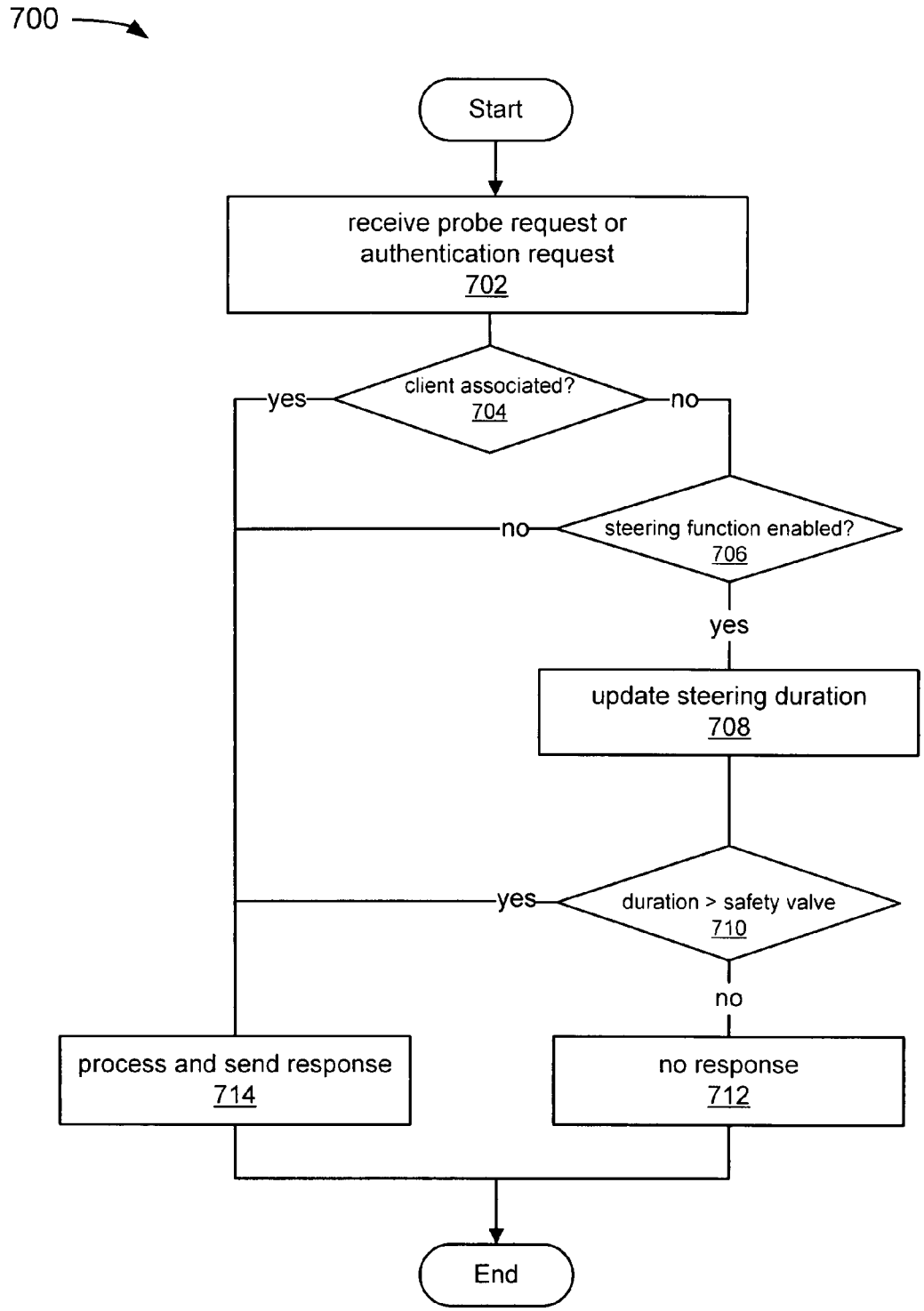
FIG. 7 depicts a flowchart of an example of a method for steering a client.

FIG. 7 depicts a flowchart 700 of an example of a method for steering a client. The method is organized as a sequence of modules in the flowchart 700. However, it should be understood that these and modules associated with other methods described herein may be reordered for parallel execution or into different sequences of modules.

In the example of FIG. 7, the flowchart 700 starts at module 702 with receiving a probe request or an authentication request. Controllers oversee the network and determine which AP allows admittance and which AP disallows admittance based on certain criteria. For APs disallowing admittance, controllers may activate their steering functions and adjust safety valves, if needed, by sending message commands through the network. Advantageously, clients may be steered in response to a probe request or an authentication request without receiving an association request.

In the example of FIG. 7, the flowchart continues to determination module 704 with deciding: is the client associated? For APs allowing admittance, controllers will deactivate their steering functions. This may allow a client to associate with an AP.

If the result from determination module 704 is yes then the flowchart proceeds to module 714 with process and send response. Having processed and sent the response, the flowchart terminates.

If the result of the determination module 704 is negative, the flowchart proceeds to determination module 706 with testing whether the steering function is enabled. Enabling the steering function may allow execution of module 708, module 710 and module 712. With the steering function enabled, responses to the client's probe and authentication requests may be inhibited as in module 712 for a duration that depends on a configurable safety valve discussed in reference to module 710. Optionally, enabling the steering function may inhibit the beaconing of SSID information when an AP is not admitting clients, additionally any desirable effect of enabling a steering function known or convenient may be implemented.

If the result of determination module 706 is yes then the flowchart proceeds to module 708 and 710, which together manage a safety valve. A timer may be used to implement the safety valve to limit the duration of the steering function for any particular client. Alternatively, a counter or other means may be used to implement the safety valve. Various clients manufactured by different vendors have their differing probing, authentication and association patterns, whereby counting the client-generated events may be an unreliable means of assessing the client's situation Thus, any manner of implementing a safety valve known or convenient may be used. The safety valve may be dynamically adjusted, either by the controllers or by the AP itself based on certain criteria to meet application requirements.

If the result of determination module 706 is no then the flowchart proceeds to module 714 with process and send response. Having processed and sent the response, the flowchart terminates.

In the example of FIG. 7, the flowchart proceeds to determination module 710 with deciding: is the duration >safety value?

If the result of the determination module 710 is yes then the flowchart proceeds to module 714 with process and send response. Having processed and sent the response, the flowchart terminates.

Figure 8:
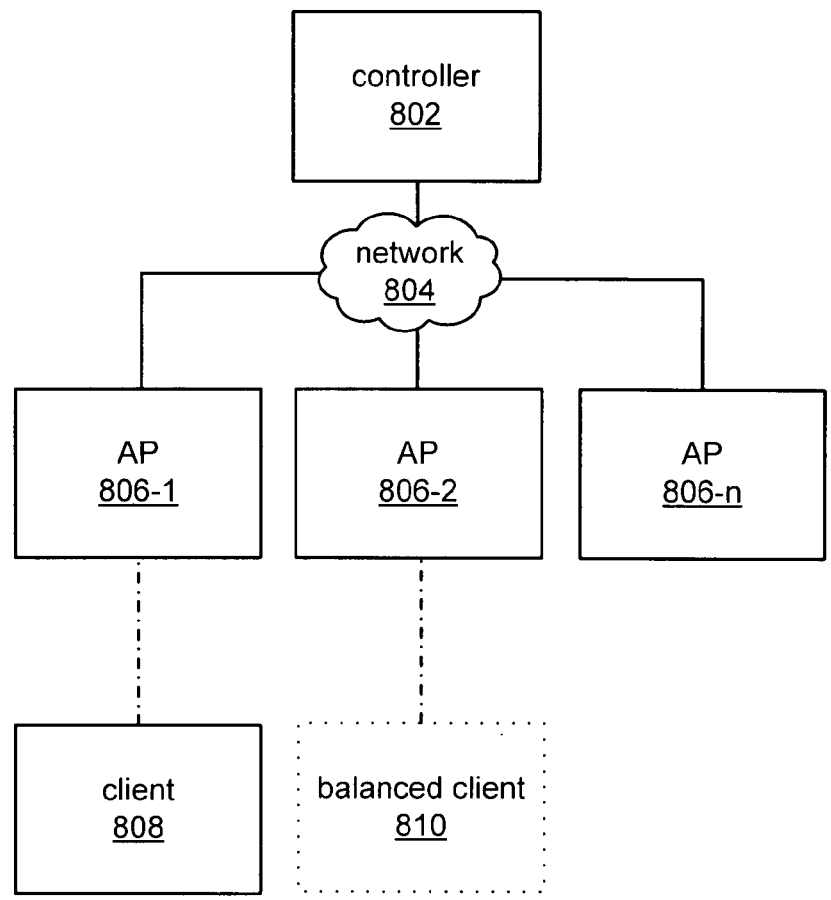
FIG. 8 depicts a diagram of an example a system steering a client from a first AP to a second AP.

If the result of the determination module 710 is no then the flowchart proceeds to module 712 with providing no response. Having provided no response, the flowchart terminates FIG. 8 depicts a diagram 800 of an example a system steering a client from a first AP to a second AP. FIG. 8 includes controller 802, network 804, AP 806-1, AP 806-2, AP 806-n (collectively APs 806), client 808, and balanced client 810.

In the example of FIG. 8, the controller 802 includes functionally to instruct an AP to de-authenticate a client, and to prevent the client from re-association to that AP. When steering associated clients is desired, a de-authentication command may be sent to a client on an overloaded AP. Because the AP is overloaded it may have its steering function activated. The de-authenticated client may have a tendency to associate to a different AP, improving the balance of the load on the AP by decreasing the number of associated clients. A safety valve timer value may be set to suit the characteristics of a particular network installation. In a non-limiting example, physical density of access points is high and a de-authenticated client may be very likely to be able to find an alternative AP; thus, the safety valve can be set to a very large value so that the previously associated AP will remain invisible to the client until after the client has associated elsewhere. Alternatively, in a less dense deployment, the safety valve may be set to a moderate value so that the client may possibly re-associate with the previously associated AP in case there are no other suitable APs within range of the client.

It may be possible that APs allowing admittance receive a burst of requests for probe, authentication and association from clients, and responses to clients have been already sent before the controller commands a change of admittance state. To meet the application requirements, either the associated clients may be later steered, or the admittance policy may be evaluated before granting the association request. If the policy shows that the AP has reached the watermark to shut down the admittance, the AP may decline association requests from clients and the controller should activate the AP's steering function.

In the example of FIG. 8, the network 804 may be a wired network, or other known or convenient manner of connecting a controller to APs 806. Network 804 may be an un-tethered network, where APs 806 are not connected by wires, but instead repeat transmissions via other APs.

In the example of FIG. 8, the APs 806 may be access points capable of associating clients and receiving instructions from controller 802.

In the example of FIG. 8, the client 808 may be any computing device capable of WLAN communication and may be associated with AP 806-1. If client 808 is to associate with AP 806-1, then AP 806-1 may be unbalanced in terms of its client load.

In the example of FIG. 8, the balanced client 810 may be a client associated with the AP 806-2. By preventing client 808 from associating with AP 806-1, client 808 may instead associate with AP 806-2 as the balanced client 810.

In the example of FIG. 8, in operation, the AP 806-1 has exceeded a client threshold, and client 808 is an associated client of AP 806-1. Controller 802 instructs AP 806-1 to de-authenticate client 808 and to not re-associate. By doing so, AP 806-2 will gain a client, and this will balance the load on AP 806-1. Client 808 is de-authenticated, and proceeds to associate with AP 806-2 as balanced client 810.

Figure 9:
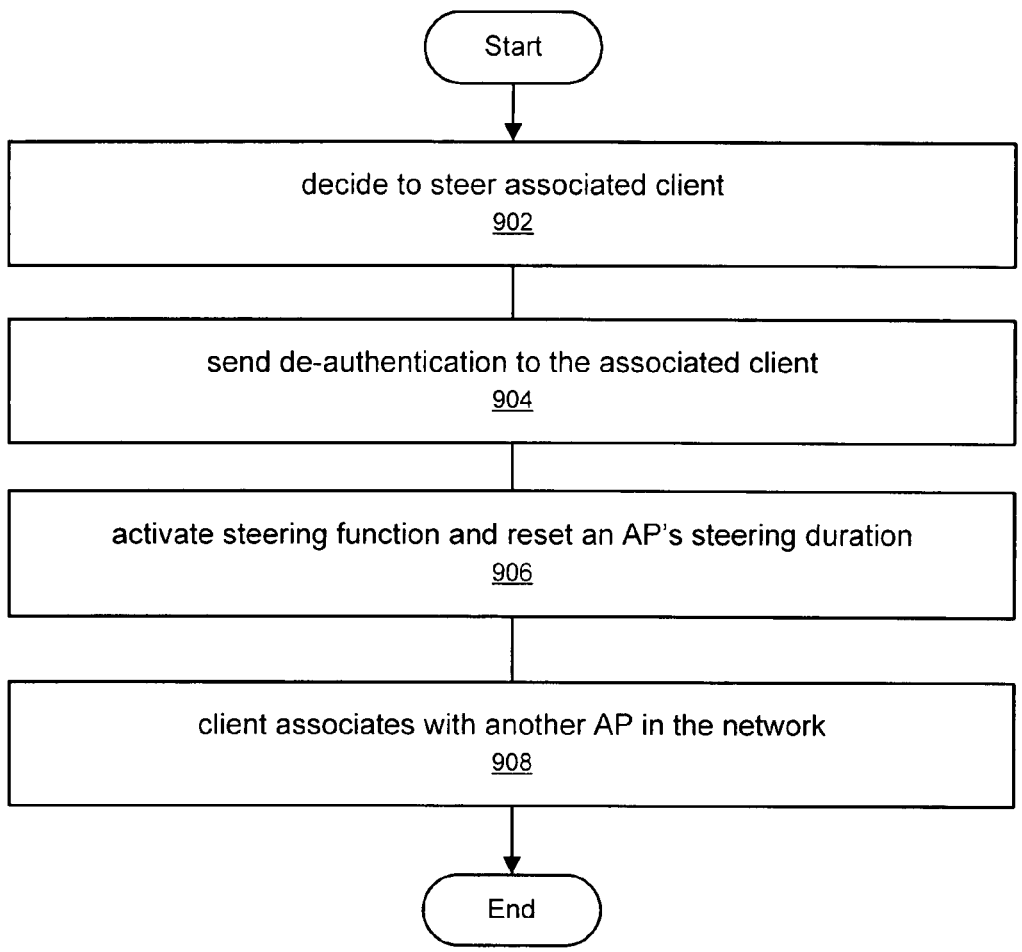
FIG. 9 depicts a flowchart of an example of a method for steering a client to a different AP.

FIG. 9 depicts a flowchart 900 of an example of a method for steering a client to a different AP. The method is organized as a sequence of modules in the flowchart 900. However, it should be understood that these and modules associated with other methods described herein may be reordered for parallel execution or into different sequences of modules.

In the example of FIG. 9, the flowchart starts at module 902 with deciding to steer an associated client. The controller may have a variety of reasons for deciding to steer an associated client. One reason may be to balance a network load. An overloaded AP may have a client steered to an under-loaded AP thereby balancing the network. The overloaded AP may be instructed to deny the client re-association.

In the example of FIG. 9, the flowchart continues to module 904 with sending a de-authentication to the associated client. The client may be simply informed that it will not longer be in communication with the AP, and the client is disconnected.

In the example of FIG. 9, the flowchart continues to module 906 with activate steering function and reset an AP's steering duration. In activating the steering function, the AP ignores any requests from the client to re-associate. The client is instead forced to associated with another AP to continue to use the network.

In the example of FIG. 9, the flowchart continues to module 908 with client associates with another AP in the network. The client is now associated with another AP that had a lower load, and could thus accommodate additional clients. Having associated with another AP in the network, the flowchart terminates.

Figure 10:
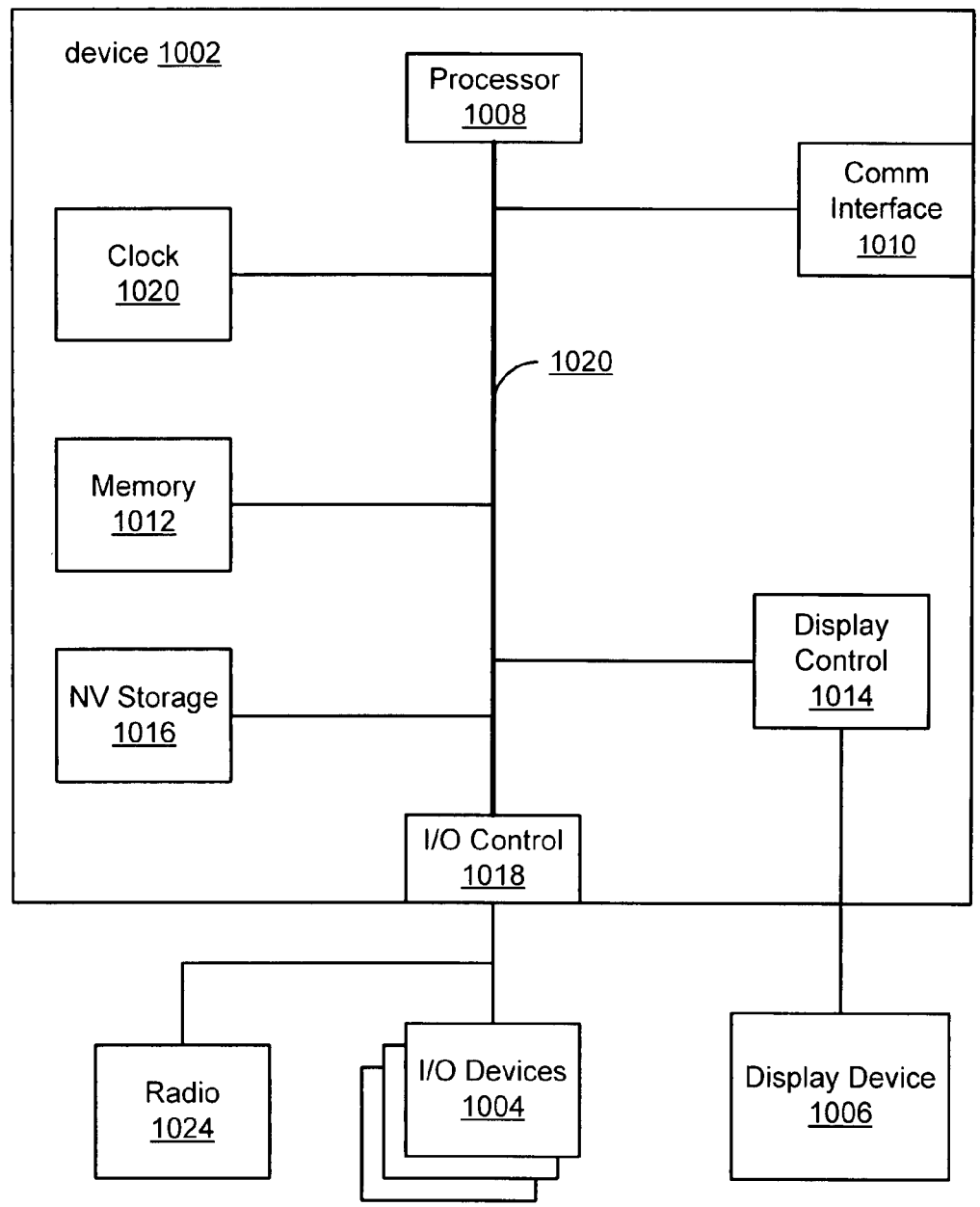
FIG. 10 depicts a diagram of an example of a device capable of load balancing.

FIG. 10 depicts a diagram 1000 of an example of a device capable of load balancing. The system 1000 may be a conventional computer system that can be used as a client computer system, such as a wireless client or a workstation, or a server computer system. The computer system 1000 includes a device 1002, I/O devices 1004, radio 1024, and a display device 1006. The device 1002 includes a processor 1008, a communications interface 1010, memory 1012, display controller 1014, non-volatile storage 1016, I/O controller 1018, and clock 1020. The device 1002 may be coupled to or include the I/O devices 1004 display device 1006, and radio 1024.

The device 1002 interfaces to external systems through the communications interface 1010, which may include a modem or network interface. It will be appreciated that the communications interface 1010 can be considered to be part of the system 1000 or a part of the device 1002. The communications interface 1010 can be an analog modem, ISDN modem, cable modem, token ring interface, ethernet interface, wireless 802.11 interface, satellite transmission interface (e.g. "direct PC"), or other interfaces for coupling a computer system to other computer systems.

The processor 1008 may be, for example, a conventional microprocessor such as an Intel Pentium microprocessor or Motorola power PC microprocessor. The memory 1012 is coupled to the processor 1008 by a bus 1020. The memory 1012 can be Dynamic Random Access Memory (DRAM) and can also include Static RAM (SRAM). The bus 1020 couples the processor 1008 to the memory 1012, also to the non-volatile storage 1016, to the display controller 1014, and to the I/O controller 1018.

The I/O devices 1004 can include a keyboard, disk drives, printers, a scanner, and other input and output devices, including a mouse or other pointing device. The display controller 1014 may control in the conventional manner a display on the display device 1006, which can be, for example, a cathode ray tube (CRT) or liquid crystal display (LCD). The display controller 1014 and the I/O controller 1018 can be implemented with conventional well known technology.

The non-volatile storage 1016 is often a magnetic hard disk, an optical disk, or another form of storage for large amounts of data. Some of this data is often written, by a direct memory access process, into memory 1012 during execution of software in the device 1002. One of skill in the art will immediately recognize that the terms "machine-readable medium" or "computer-readable medium" includes any type of storage device that is accessible by the processor 1008 and also encompasses a carrier wave that encodes a data signal.

Clock 1020 can be any kind of oscillating circuit creating an electrical signal with a precise frequency. In a non-limiting example, clock 1020 could be a crystal oscillator using the mechanical resonance of vibrating crystal to generate the electrical signal.

Radio 1024 may be any combination of known or convenient electrical components including by way of example, but not limitation, transistors, capacitors, resistors, multiplexers, wiring, registers, diodes or any other electrical components known or convenient.

The system 1000 is one example of many possible computer systems which have different architectures. For example, personal computers based on an Intel microprocessor often have multiple buses, one of which can be an I/O bus for the peripherals and one that directly connects the processor 1008 and the memory 1012 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1012 for execution by the processor 1008. A Web TV system, which is known in the art, is also considered to be a computer system, but it may lack some of the features shown in FIG. 10, such as certain input or output devices. A typical computer system will usually include at least a processor, memory, and a bus coupling the memory to the processor.

In addition, the system 1000 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 1016 and causes the processor 1008 to execute the various acts required by the operating system to input and output data and to store data in memory, including storing files on the non-volatile storage 1016.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

What is claimed is:

1. A method comprising:
   determining, by a network device, that a first number of clients associated with a first access point (AP) is less than a second number of clients associated with a second AP;
   setting, by the network device, a target load threshold associated with the first AP, where the target load threshold is based on the second number of clients;
   disabling, by the network device, association capabilities, of the first AP, for associating additional clients with the first AP when the first number of clients exceeds the target load threshold; and
   applying, by the network device and based on the association capabilities of the first AP being disabled, a limits test to a first coverage area, associated with the first AP, and to a second coverage area, associated with the second AP, where the limits test is applied to determine an area of overlap between the first coverage area and the second coverage area.

2. The method of claim 1 further comprising:
   calculating, based on the first number of clients and the second number of clients, an aggregate load associated with the first AP and the second AP; and
   redistributing the aggregate load to the first AP and the second AP, where the one or more of the first number of clients are steered to the second AP based on the redistribution of the aggregate load.

3. The method of claim 1, where applying the limits test further comprises:
   interpolating between a limit of the first coverage area and a limit of the second coverage area to determine the area of overlap, where the area of overlap is determined in terms of a smaller of the first coverage area and the second coverage area.

4. A system comprising:
   a network device including:
      an overlap calculation engine to determine an area of overlap between an access point (AP) and another AP,
      a target load calculation engine coupled to the overlap calculation engine, and
      an admittance determining engine coupled to the target load calculation engine,
   where the target load calculation engine calculates a target load for the AP based on data determined by the overlap calculation engine; and
   where the admittance determining engine:
      determines whether a number of clients associated with the AP exceeds a threshold number of clients, and
      sends, when the number of clients exceeds the threshold number of clients, instructions to the AP to close a safety valve based on the determination, where closing the safety valve causes one or more of clients, seeking to associate with the AP, to be steered to the other AP.

5. The system of claim 4, where the admittance determining engine:
   generates, based on determining whether the number of clients exceeds the threshold number of clients, a value between zero and one that is included in the instructions sent to the AP, where the value comprises zero when the AP is to not admit additional clients, the value comprises one when the AP is to admit the additional clients, and the value is less than one and greater than zero when the AP is to admit some, but not all of the additional clients.

6. The system of claim 4, where, based on the instructions, clients are steered from the AP to the other AP.

7. The system of claim 4, where the network device:
   receives a message, from a controller associated with an access area that is different than an access area associated with the AP, the message including information about APs in the access area associated with the controller, and
   calculates, based on the message, the target load to steer clients to the access area associated with the controller.

8. The system of claim 4, where a timer limits the duration of the closure of the safety valve to a time determined by the network device.

9. The system of claim 4, where, based on the calculated target load, the network device transmits a message to a controller, associated with an access area that is different than an access area associated with the AP, to cause the controller to steer clients to the AP.

10. A method comprising:
    receiving a report that a first access point (AP), associated with a local access area, is in communication with a second AP, associated with a non-local access area;
    identifying a controller associated with the non-local access area;
    transmitting a message to the controller;
    receiving a message from the controller, the message including a current client load on the second AP;
    calculating an overlap between the first AP and the second AP;
    calculating a target load for the first AP;
    generating, based on determining whether a number of clients associated with the first AP exceeds the target load, a value between zero and one; and
    transmitting, to the first AP, instructions including the generated value, where the value comprises zero when the first AP is to not admit additional clients, the value comprises one when the first AP is to admit the additional clients, and the value is less than one and greater than zero when the first AP is to admit some, but not all of the additional clients.

11. The method of claim 10, where the message is transmitted to the controller based on:
the first AP being in radio communication with the second AP in the non-local access area, controlled by the controller, and
the second AP and the first AP being associated with different access areas.

12. A network device comprising:
a controller to:
determine that a first number of clients associated with a first access point (AP) is less than a second number of clients associated with a second AP,
set, based on the second number of clients, a target load threshold associated with the first AP,
disable, when the first number of clients exceeds the target load threshold, association capabilities of the first AP, for associating additional clients with the first AP,
apply, based on disabling the association capabilities, a limits test to a first coverage area, associated with the first AP, and a second coverage area, associated with the second AP, to determine an area of overlap between the first coverage area and the second coverage area.

13. The network device of claim 12, where, when disabling the association capabilities, the controller is to:
calculate, based on the target load threshold, a value, and include the value in instructions transmitted to the first AP, where the value comprises:
a first value to indicate that the first AP is to prevent all of the additional clients from associating with the first AP, or
a second value to indicate that the first AP is to prevent less than all the additional clients from associating with the first AP.

* * * * *